US012613403B2

(12) United States Patent
Grunwald et al.

(10) Patent No.: US 12,613,403 B2
(45) Date of Patent: Apr. 28, 2026

(54) SYSTEM AND METHODS OF DICHROIC FREE FLUORESCENCE ILLUMINATION USING REFLECTIVE OBJECTIVE LENSES

(71) Applicant: University of Massachusetts, Boston, MA (US)

(72) Inventors: David Grunwald, Worcester, MA (US); Maximiliaan Huisman, North Brookfield, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 1001 days.

(21) Appl. No.: 17/274,627

(22) PCT Filed: Sep. 13, 2019

(86) PCT No.: PCT/US2019/051096
§ 371 (c)(1),
(2) Date: Mar. 9, 2021

(87) PCT Pub. No.: WO2020/056318
PCT Pub. Date: Mar. 19, 2020

(65) Prior Publication Data
US 2022/0050279 A1 Feb. 17, 2022

Related U.S. Application Data

(60) Provisional application No. 62/730,970, filed on Sep. 13, 2018.

(51) Int. Cl.
*G02B 21/00* (2006.01)
*G02B 21/06* (2006.01)
*G02B 21/16* (2006.01)

(52) U.S. Cl.
CPC ............. *G02B 21/06* (2013.01); *G02B 21/16* (2013.01)

(58) Field of Classification Search
CPC ............... G02B 21/00; G02B 21/0004; G02B 21/0032; G02B 21/006; G02B 21/0076;
(Continued)

(56) References Cited

U.S. PATENT DOCUMENTS 4,744,642 A * 5/1988 Yoshinaga ............. G02B 21/24
359/434
4,922,104 A * 5/1990 Eguchi ................... G02B 21/24
359/356
(Continued)

FOREIGN PATENT DOCUMENTS

EP          243 680 B2 * 4/1994
WO    2015092778 A1    6/2015
(Continued)

OTHER PUBLICATIONS

Larson, J., et al. "Design and construction of a multiwavelength, micromirror total internal reflectance fluorescence microscope", Nature Protocols, vol. 9, No. 10, pp. 2317-2328. Oct. 1, 2014. 2317-2328.
(Continued)

*Primary Examiner* — Thong Q Nguyen
(74) *Attorney, Agent, or Firm* — Hamilton, Brook, Smith & Reynolds, P.C.

(57) ABSTRACT
The invention provides for a system and methods of directly delivering excitation light to a sample by a path that avoids traveling though the objective and dichroic mirror. Certain embodiments of the system may include an excitation light source, and a series of mirrors and lenses to direct the excitation light to a diffuser unit. The diffuser unit may then generate a configurable illumination profile to evenly illuminate a sample.

11 Claims, 9 Drawing Sheets

(58) Field of Classification Search
  CPC ........ G02B 21/02; G02B 21/04; G02B 21/06;
        G02B 21/08; G02B 21/082; G02B
      21/084; G02B 21/16; G02B 21/24; G02B
                  21/241
  USPC ................................. 359/368–390, 850–865
  See application file for complete search history.

(56)                References Cited

U.S. PATENT DOCUMENTS

|  |  |  |  |  |
|---|---|---|---|---|
| 5,581,085 | A * | 12/1996 | Reffner | G02B 21/04 |
|  |  |  |  | 250/339.05 |
| 6,274,871 | B1 * | 8/2001 | Dukor | G02B 21/0004 |
|  |  |  |  | 250/339.08 |
| 6,674,575 | B1 * | 1/2004 | Tandler | G02B 21/06 |
|  |  |  |  | 359/368 |
| 6,850,362 | B2 * | 2/2005 | Brooker | G02B 21/24 |
|  |  |  |  | 359/368 |
| 6,963,445 | B2 * | 11/2005 | Hoover | G02B 5/0278 |
|  |  |  |  | 359/368 |
| 6,989,925 | B2 * | 1/2006 | Karasawa | G02B 21/10 |
|  |  |  |  | 359/368 |
| 7,300,795 | B2 * | 11/2007 | Koller | C12M 47/06 |
|  |  |  |  | 435/460 |
| 7,528,374 | B2 * | 5/2009 | Smitt | G01J 3/0202 |
|  |  |  |  | 422/82.05 |
| 8,270,071 | B2 * | 9/2012 | Glaser | G02B 17/008 |
|  |  |  |  | 359/381 |
| 10,302,925 | B2 * | 5/2019 | Nakata | G02B 21/248 |
| 2004/0113095 | A1 | 6/2004 | Peltie et al. |  |
| 2012/0050734 | A1 | 3/2012 | Wennmalm et al. |  |
| 2014/0131593 | A1 | 5/2014 | Nakata et al. |  |
| 2016/0195705 | A1 | 7/2016 | Betzig et al. |  |
| 2018/0074304 | A1 | 3/2018 | Hernandez-Cubero et al. |  |

FOREIGN PATENT DOCUMENTS

| WO | 2016/199229 | * | 12/2016 |
|---|---|---|---|
| WO | 2020/056318 | A1 | 3/2020 |

OTHER PUBLICATIONS

Sergey, L.P., et al., "Subpicosecond Kerr-Gate Spectrofluorometry",
In: "Metabolomics : Methods and Protocols", Aug. 30, 2013.
Anonymous: "ZEISS Microscopy Online Campus | Microscopy
Basics | Contrast in Reflected Light Microscopy", Aug. 3, 2018
(Aug. 3, 2018), XP055915943, Retrieved from the Internet: URL:https://
web.archive.org/web/20180803034835/https://zeiss-campus.magnet.
fsu.edu/articles/basics/reflectedcontrast.html [retrieved on Apr. 27,
2022].
Extended European Search Report for EP 19 860 451 dated May 11,
2022.
International Preliminary Report on Patentability for PCT/US2019/
051096 dated Mar. 9, 2021 titled "System and Methods of Dichroic
Free Fluorescence Illumination Using Reflective Objective Lenses".
PCT International Search Report and Written Opinion for Interna-
tional Application No. PCT/US2019/051096, entitled "System and
Methods of Dichroic Free Fluorescence Illumination Using Reflec-
tive Objective Lenses," mailed on Dec. 5, 2019.

* cited by examiner

SYSTEM AND METHODS OF DICHROIC FREE FLUORESCENCE ILLUMINATION USING REFLECTIVE OBJECTIVE LENSES

CROSS-REFERENCE TO RELATED APPLICATIONS

This application is the U.S. National Stage of International Application No. PCT/US2019/051096, filed Sep. 13, 2019, which designates the U.S., published in English, and claims the benefit of U.S. Provisional Application No. 62/730,970, filed on Sep. 13, 2018. The entire teachings of the above applications are incorporated herein by reference.

STATEMENT REGARDING FEDERALLY SPONSORED RESEARCH

This invention was made with government support under grant no. EB021238 awarded by the National Institutes of Health, and grant no. P60016170000198 awarded by the Worcester Science Foundation. The government has certain rights in the invention.

FIELD OF INVENTION

The invention relates generally to a system and methods of viewing a microscope sample using fluorescence microscopy. More specifically, the invention relates to a fluorescence observation system in which a microscope sample may be directly illuminating with an excitation light source without the use of a dichroic mirror.

BACKGROUND OF THE INVENTION

Fluorescence microscopy plays a major role as a diagnostic tool in many natural-science disciplines. A fundamental principle of fluorescence microscopy is based upon delivery of short-wave excitation light ("excitation light") to a biological sample whereupon the sample itself, or a photoreactive dye mixed with or staining the sample, emits a longer-wave fluorescent light (primary or secondary fluorescence), termed "emission light", upon excitation with the short-wave excitation light. For fluorescence microscopy, secondary fluorescence generally is used to visualize certain specimen structures of stained preparations. It is possible, using fluorescence microscopy, to visualize and/or identify, for example, various pathogens, locate the position of genes, or determine genetic changes in, for example, the DNA that is being examined, or to visualize various proteins and other structures that are formed in a cell.

Various methods of examining a sample using specific fluorescing dyes (so-called fluorophores or fluorochromes) are available to the use. Typical excitation frequencies are in the ultraviolet and visible spectral region. For example, excitation using UV light for the "DAPI" dye, blue light for the "FITC" dye, or green light for the "Texas Red" or "rhodamine" dyes are common.

Short-arc lamps filled with mercury or xenon, or halogen lamps, are used normally as light sources in the illumination systems for fluorescence microscopes. The light sources are most frequently located in a separate lamp housing that is adapted to the microscope. The aforementioned light sources possess a substantially continuous spectrum (UV to IR) that is interspersed with characteristic lines of high intensity. Other excitation light sources include lasers and light emitting diodes. The spectral region appropriate for excitation of a fluorochrome may be selected from the spectral region of the light source by means of various (exchangeable) dielectric filters, called excitation filters. The bandwidth of such excitation filters typically is about from 10 to 30 nm.

Microscopes typically include various fluorescence filter systems (so-called filter blocks or filter cubes) so that different stains in a preparation may be visualized. These fluorescence filter systems comprise a mutually coordinated combination of an excitation filter, a dichroic splitter, and a blocking filter. The dichroic mirror reflects the excitation light to the sample, but is transparent to the fluorescent light emitted from the preparation. The blocking filter shields the preparation from scattered excitation light that enters the objective. The various fluorescence filters usually are located on a changing device that may be, for example, a slider or a carousel that is operated either manually and/or in motorized fashion.

In spite of their usefulness, fluorescence microscopes have several disadvantages. For example, such microscopes that may image multiple fluorophores in a sample reactive to different excitation wavelengths may require increasingly more complicated and costly dichroic mirrors in order to image the sample. Alternatively, the imaging of the multiple different fluorophores may require a time-consuming and potentially complex exchange of multiple dichroic mirrors between measurements of each of the fluorophores.

Further, and perhaps more significant than the added expense and complexity of the use of multiple dichroic mirror systems, is the potential for the dichroic mirror to cause an optical aberration in the objective and captured sample image. This may result in a sample image of poor quality, thus requiring special software capable of correcting the image or, alternatively, may require that the experiment be repeated which, in some cases, may not be practical.

Accordingly, there is a need for a cost-effective system and methods of exposing an objective and sample to light of a certain excitation wavelength for fluorescence observation that circumvents the need for one or more dichroic mirrors in order to capture a high quality of image of the sample of interest. The present invention satisfies this need.

SUMMARY OF THE INVENTION

The invention provides for a system and methods of delivering excitation light directly to a microscopy sample without the use of a dichroic mirror that may otherwise cause reflective and/or chromatic aberrations in the objective, and, ultimately, in the captured image of the sample. The dichroic free microscope system uses an apparatus or module that may be attachable to an existing microscope or the module may be made integral to a microscope.

Certain embodiments of the invention may deliver excitation light directly to the sample through a light delivery path parallel to the optical axis of the objective—through the use of a series of mirrors and, optionally, a diffuser unit—to illuminate a microscope sample.

One certain preferred embodiment of the invention includes an excitation light source, a mirror-based objective configured for use with an objective collar, and one or more excitation tubes optically connected to the excitation light source. The excitation tube may receive and direct an excitation light beam to a focusing element disposed at one end of the excitation tube. The focusing element may be configured to direct the excitation light beam onto a series of mirrors. The series or mirrors may include a first mirror positioned to reflect the excitation light beam received from the focusing element to a second mirror positioned such that is horizontally in line with the first mirror. The second mirror may deliver the excitation light beam to a sample positioned above the second mirror.

In other certain embodiments of the invention, a light diffuser unit may be positioned between the second mirror and the sample. The light diffuser unit may be configurable to adjust the illumination profile of the excitation light beam to deliver a homogenous distribution of power across the field of view of the sample.

Embodiments of the invention may include also a mirror positioning adapter coupled to the objective and objective collar. The mirror positioning adapter is adjustable along one more axes, and may include, for example, a sliding mechanism adjustable along each of the x, y, z axis to permit the user to adjust the positioning and angle of the reflective element or focusing elements to which it is mechanically coupled in order to direct the excitation light to the sample via a second mirror and/or diffuser unit. The mirror positioning adapter may be adjustable by the user either through manual or automated means.

Advantageously, embodiments of the invention make use of a particular geometry and a long working distance of the mirror-based objective—that is, the clearance between the objective enclosure and the sample or focus plane—to position one or more small mirrors that may be used to deliver excitation light to the sample independent of a dichroic mirror. The use of such mirrors may allow also the use of any and all excitation wavelengths within the reflective range (i.e., wavelength) of the small mirrors that is not possible using a dichroic mirror.

Advantageously, the removal of the dichroic mirror— such as during the use of a mirror-based objective to either directly form an image of the sample or used with a curved mirror such as a 'tube-lens' to form the image—eliminates any non-orthogonal dispersive materials in the emission path. This makes the system fully achromatic.

Advantageously, the optical elements (e.g., mirrors) do not reduce the amount of light collected through the sample-facing aperture of the objective.

Advantageously, use of the present invention may allow for custom shaping of the excitation light profile as it passes into the sample through the use of a diffuser positioning above the second mirror (on top of the objective). The profile of the excitation light may be shaped into, for example, a flat 'top-hat' profile, rather than the traditional Gaussian profile, to allow a more homogenous excitation of fluorophores across the field of view.

Advantageously, embodiments of the present invention use a mirror system to deliver light of any wavelength to a sample without the need to change or remove an optical element (e.g., dichroic mirror) when moving between measurements of multiple fluorophores in a sample.

Advantageously, embodiments of the present invention permit the objective and the excitation unit (e.g., focusing lenses, reflective mirrors, diffuser unit) to move in unison during focus adjustment.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION OF THE INVENTION

The present invention generally is directed to a system and methods that use an apparatus to deliver excitation light directly to a microscope sample—by bypassing the objective and without the use of a dichroic mirror that may otherwise cause chromatic aberrations—that may be used with mirror-based objective lenses.

Figure 1:
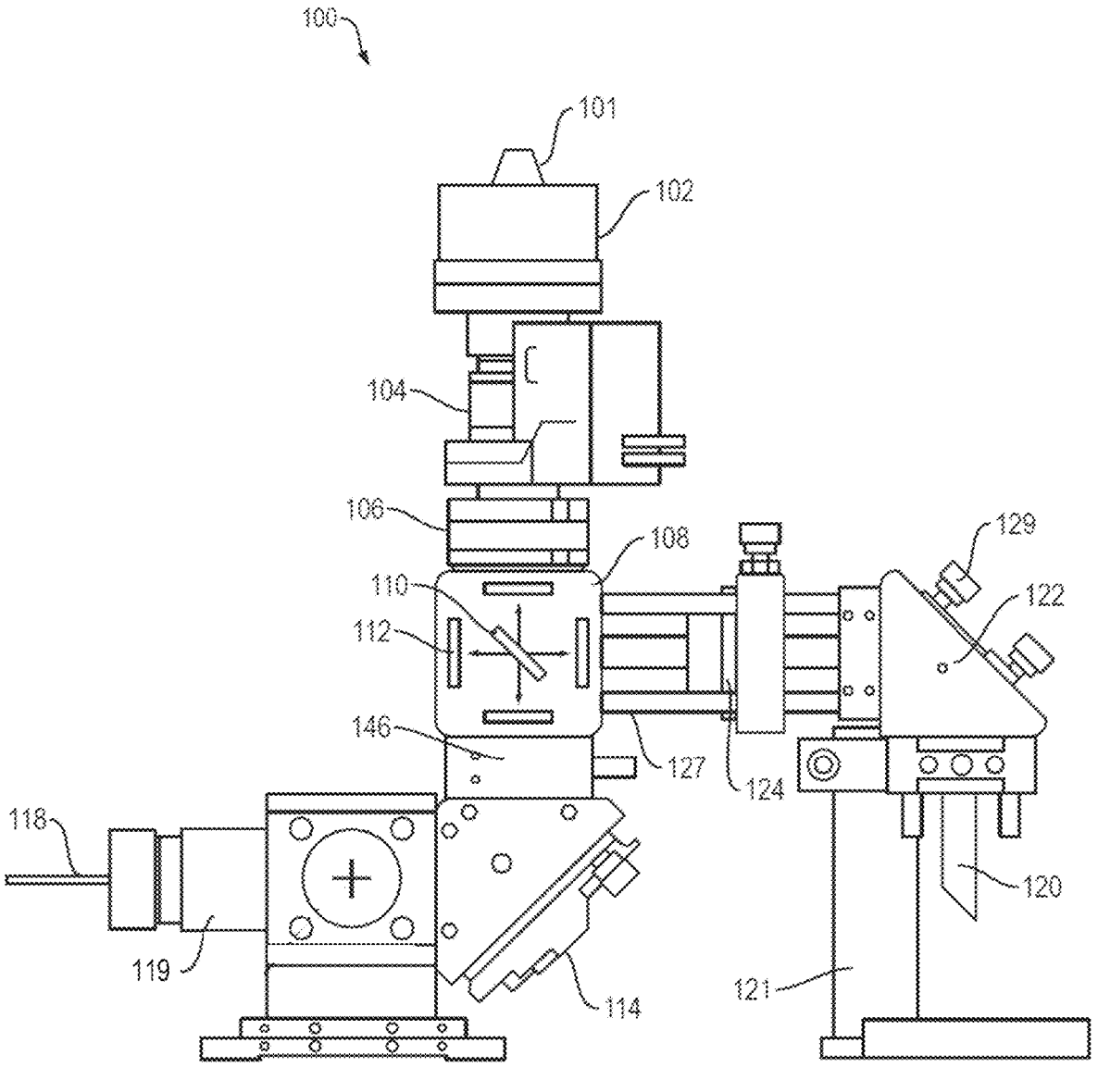
FIG. 1 illustrates a side view of a traditional microscope that uses a dichroic mirror to illuminate a sample with an excitation light beam.

FIG. 1 illustrates a typical microscope 100 that uses a dichroic mirror 110 (hereafter referred to as a "DM microscope") to deliver excitation light 120 from an excitation light source to a microscope sample positioned above objective 101. In some of the figures, certain parts are "cut-away" to show the pathway of the light. Suitable excitation light source for use with the invention may include any light source that may emit light in the desired wavelength such as a laser, light emitting diodes, a bulb (e.g., mercury-arc, xenon-arc, or metal-halide), or other white light or full light spectrum sources. In certain preferred embodiments, the excitation light source is a bulb emitting multiple wavelengths capable of exciting fluorophores.

The excitation light source (e.g., a laser) may be optically coupled to the DM microscope through the use of one or more reflective elements positioned within the reflective element housing 122. One or more support members 121, 127 may support the reflective element housing 122. The reflective element housing 122 may include one or more adjustment elements 129 configurable to adjust the angle and direction of each reflective element positioned within the reflective element housing 122. The excitation light beam 120 may be directed from the reflective elements in the reflective element housing 122 to the filter cube housing 108 through the excitation tube lens 124. The excitation tube lens 124 may comprise one or more convex or concave lenses that may be used to focus and/or adjust the path of the excitation beam 120. The excitation light beam then may pass through one or more excitation filters 112 positioned in the filter cube housing that may be used to select the wavelength of the excitation light beam that illuminates the sample. The excitation filters 112 may be manually removable and replaceable through, for example, a slot in the filter cube housing, depending on the excitation wavelength and fluorophores in the sample. Alternatively, the excitation filters may be movable within the filter cube housing through automated means such as a turret.

After passing through the excitation filters, the excitation light beam encounters a dichroic mirror 110 positioned in the path of the excitation light beam. The dichroic mirror 110 may be adjustable, either manually or through automated means (e.g., interface with a controller), to any angle in relation to the excitation light beam path. For example, the dichroic mirror 110 may be positioned from about a 90-degree angle to about a 45-degree angle relative to the excitation light beam path. The dichroic mirror 110 may reflect a portion of the excitation light beam 120 through a series of manual focusing components 106 and/or pi-foc piero focusing elements 104 to a reflective objective 101 and objective collar 102. The excitation light beam may then pass through the objective 101 and illuminate the sample, causing a fluorophore in the sample to emit an emission light beam 118 (i.e., light of a different wavelength than the excitation light.). The objective 101 may capture the emission light and direct it back through the dichroic mirror 110 and, optionally, one or more emission filters 146 positioned below the filter cube housing 108. The emission light then may be directed to one or more mirrors (not shown) such as, for example, a parabolic mirror, positioned within the mirror housing 114 and in the path of the emission beam light. The mirrors reflect the emission beam through the emissions tube 119 where the emission light is collected by an imaging capturing device such as a camera coupled to the microscope to display an image on a suitable viewing apparatus such as a computer screen or the like.

In contrast, a dichroic-free microscope (hereafter "DF microscope") is not dependent upon the dichroic mirror to deliver an excitation light beam to the sample and objective. Instead, a DF microscope may use an excitation light source coupled to a series of mirrors to directly illuminate a sample while bypassing the objective and the dichroic mirror entirely. Thus, the excitation light that is delivered to the sample is essentially achromatic (since the light does not pass through the dichroic mirror and/or filters). Further, the use of a DF microscope eliminates many of the reflective and chromatic aberrations introduced into the system by the tilted and/or curved glass surfaces or surfaces having a certain flatness and/or variation in thickness in the excitation/emission light path. For example, imperfections of the dichroic mirror may impact the wave front of the emission light that may result in optical aberrations.

Figure 2:
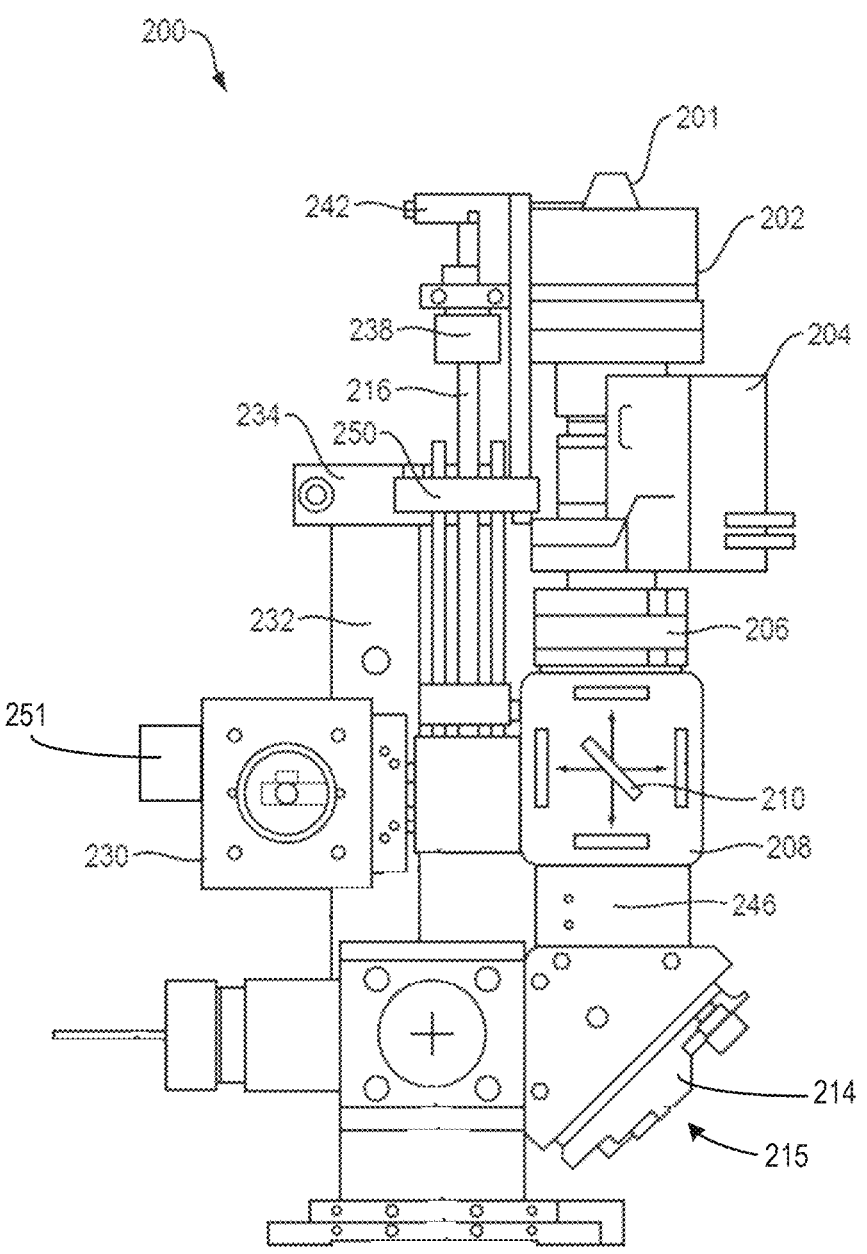
FIG. 2 illustrates a side view of a preferred embodiment of a microscope of the invention that does not use a dichroic mirror to illuminate a sample.
Figure 3:
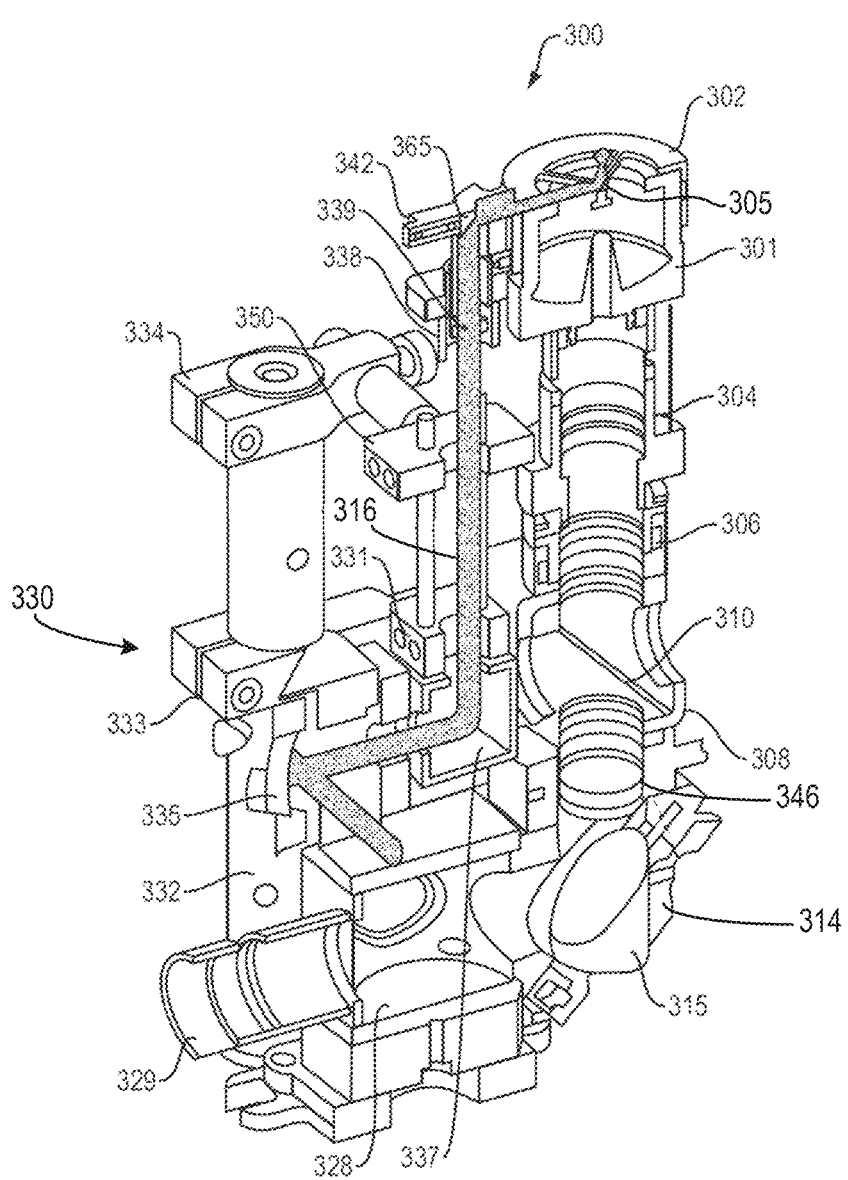
FIG. 3 illustrates a cut-away perspective view of the embodiment of FIG. 2.

FIG. 2 and FIG. 3 illustrate one certain preferred embodiment of a DF microscope 200, 300. The DF microscope 200, 300 may include many of the components of a DM microscope such as described in FIG. 1: a reflective objective 201, 301 and objective collar 202, 302, pi-foc focusing element 204, 304, manual focusing element 206, 306, filter cube housing 208, 308, dichroic mirror 210, 310, emissions filters 246, 346, parabolic mirror support 214, 314, and parabolic mirror 215, 315. In addition to these components, the DF microscope may include further an excitation light source 251 coupled to an excitation beam positioner 230, 330, that comprises a housing and one or more reflective elements 335, 337 that is supported by mounting plate 333. The excitation beam positioner 230, 330 directs the excitation light beam through the excitation beam tube 216, 316, to the focusing element housing 238, 338. The focusing element housing 238, 338 may include one or more focusing elements 339 (e.g., lenses, mirrors, curved mirrors) that may be used to focus or otherwise adjust the excitation light beam to impact a reflective element 365 and/or the sample.

Preferred embodiments of the invention may include also a mirror position adapter 242, 342 mechanically connected to the reflective element 365 that may be used to adjust the reflective element 365 so that the excitation light beam impacts a second mirror and/or diffuser unit 305 and is then channeled to the sample of interest. Support members 232, 234, 250, 331, 332, 334, 350 may provide structural support for the focusing element housing 238, 338, excitation beam tube 216, 316, mirror position adapter 242, 342, objective 101, 201 and objective collar 202, 302, and diffuser unit 305.

Figure 4:
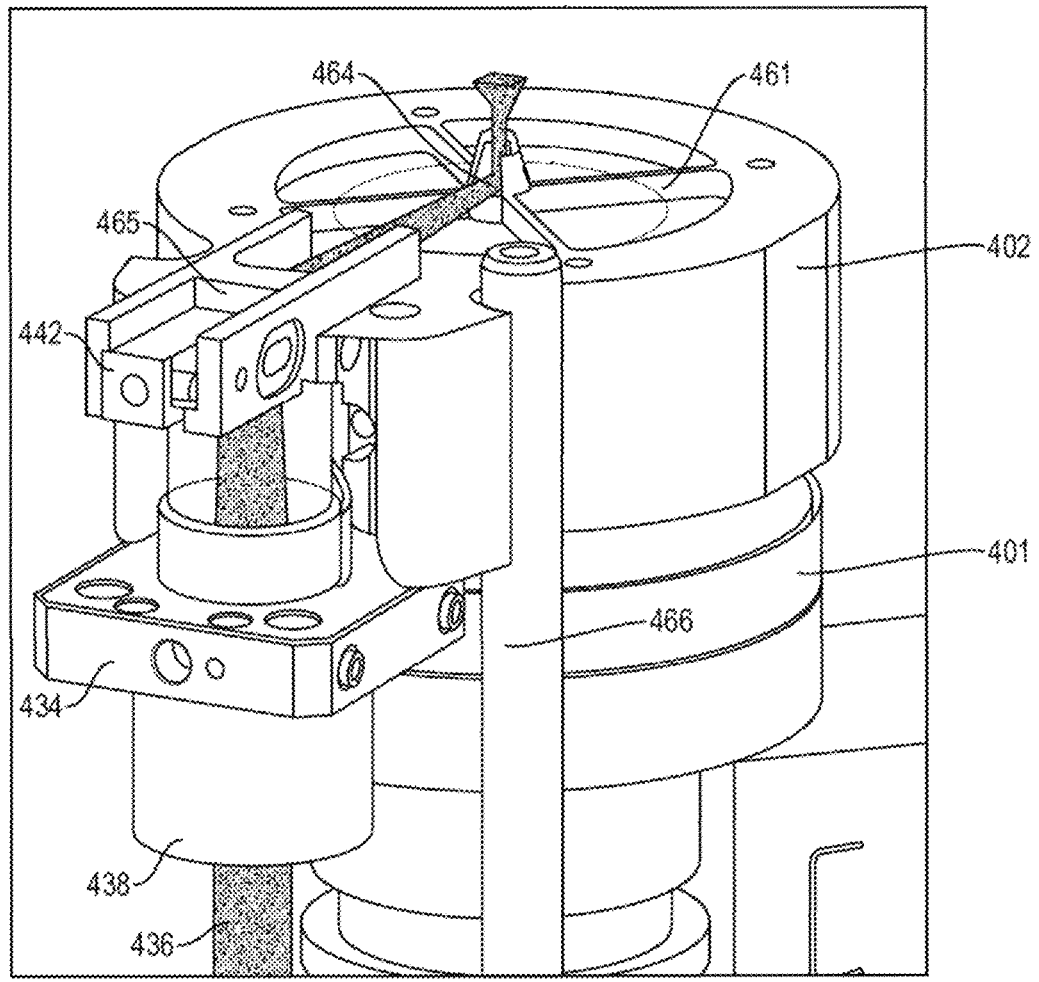
FIG. 4 illustrates a perspective view of one embodiment of an objective and dichroic free illumination components of the invention.
Figure 5A:
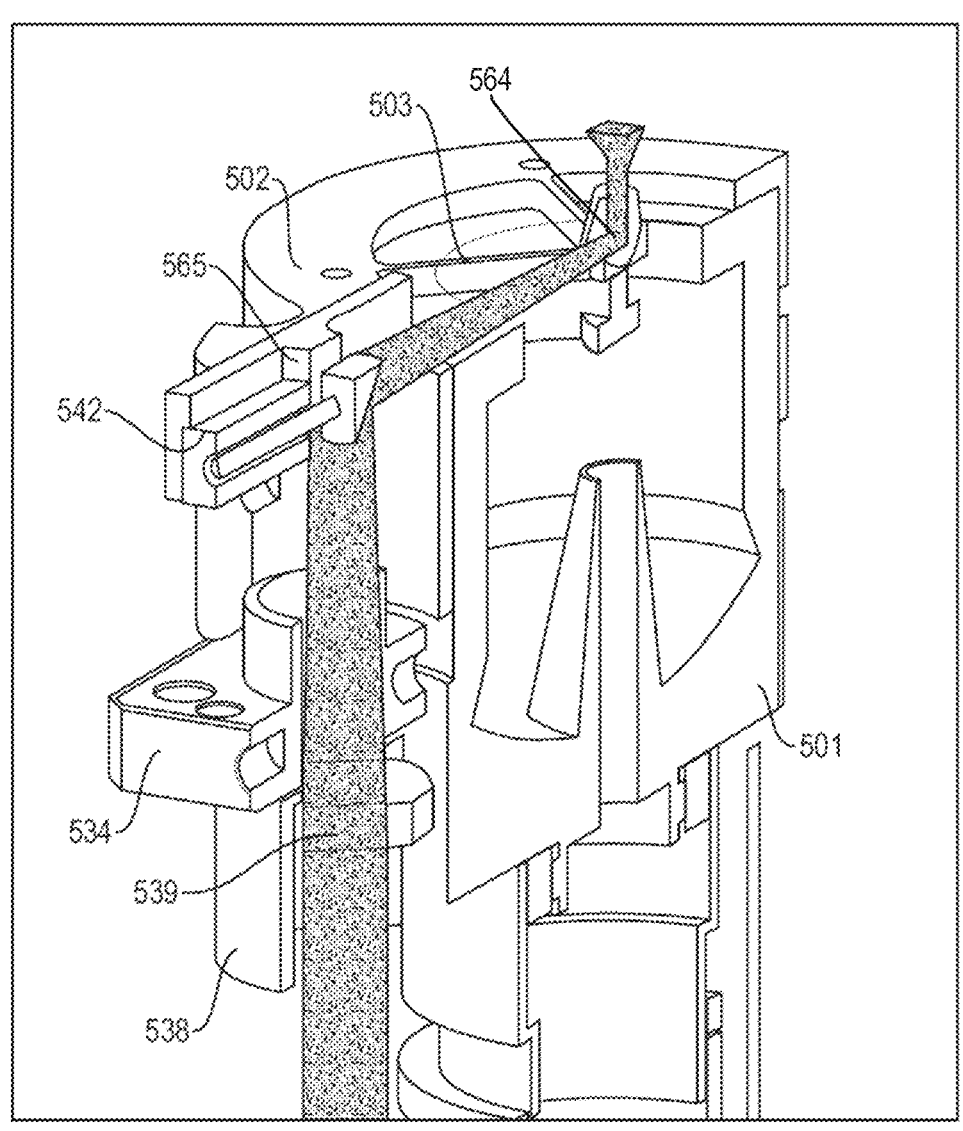
FIG. 5A illustrates a cut-away perspective view of the embodiment of FIG. 4.
Figure 5B:
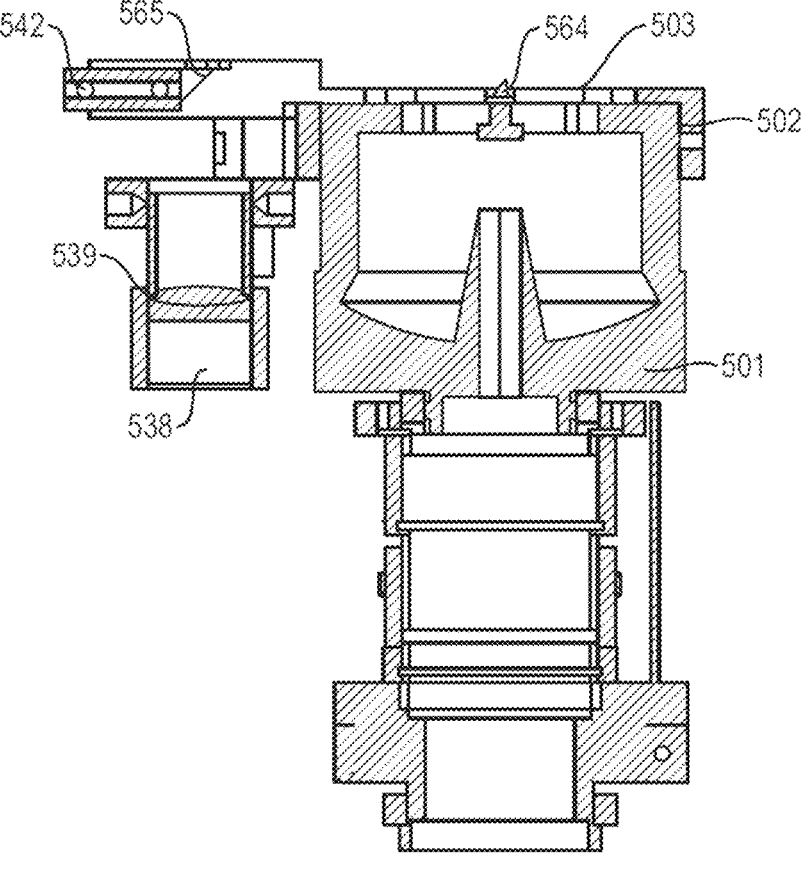
FIG. 5B illustrates a side view of the embodiment of FIG. 4.

FIG. 4, FIG. 5A, and FIG. 5B illustrate the objective, illumination components, and supporting structures of one preferred embodiment of the invention. The excitation light beam (shown traveling through the excitation tube) may be directed from the excitation light source, through one or more mirrors positioned within the excitation beam positioner 230, and into the excitation beam tube 436 that is coupled to the objective collar. Once in the excitation beam tube 426, the excitation light encounters focusing elements 539 positioned in the focusing element housing 438, 538. The focusing element housing may be positioned below mounting plate 434, 534 that also may function as a support for the excitation beam tube 436, 536. The mounting plate 434, 534 and support 466 also may connect and support the mirror position adapter 442, 542 and objective collar 402, 502. The excitation light tube 436 also may be configured to receive an alignment tool to align the excitation beam with the optical axis of the microscope and/or the optical axis of the mirror.

The excitation light may then pass through the focusing element 539 (e.g. a lens or mirror) positioned within the focusing element housing 438, 538. The focusing element 539 may be, for example, a convex lens and may converge the incoming parallel excitation light beam in order to control the size of the illuminated area of the sample. The focusing element 539 may adjust focus of the excitation light and/or the excitation "spot" where the beam impacts the sample by moving the focusing element 539 or focusing element housing 438, 538, for example, either upward or downward in a linear fashion in the mounting plate 434, 534.

The focusing element 539 may deliver the excitation light beam parallel to the focal plane of the sample through the use of one or more reflective elements 464, 564, 465, 565 (or any small reflective surface or light steering material, e.g. a crystal, mirror, prism) each having a length of about 3 millimeters to about 5 millimeters dependent upon the objective with which the reflective elements are used. Alternatively, embodiments of the invention may deliver the excitation light beam into the mirror system without the use of the focusing element 539. The reflective elements 464, 564, 465, 565 may be positioned and angled to reflect the excitation light beam as needed (e.g., 90°, 45°).

The relatively long working-distance (~1 cm) of the objective 401, 501 used to image emission light from a fluorophore may allow the placement of one or more of the reflective elements (e.g., 564, 565) to direct the excitation light beam from the focusing element 539 to the sample. Preferably, a first reflective element 464, 564 may be disposed on or within the objective collar 402, 502 between the objective 401, 501 and the sample (e.g. on the spider 503 described below). A second reflective element 465, 565 may be positioned in line with the first reflective element 464, 564. The second reflective element 465, 565 may be supported by a mirror positioning adapter 442, 542 connected to the objective collar 402, 502. The mirror positioning adapter 442, 542 permits movement of the mirror in the x, y, and z directions. One embodiment of the mirror positioning adapter and may include, for example, a sliding mechanism adjustable along each of the x, y, z axis to enable rotation and movement of the second reflective element 465, 565 relative to the first reflective element 464, 564 and may be used to focus and/or adjust the excitation light beam. The mirror position adjustment may be either manually or robotically controllable by mechanically coupling x, y, and z translation motors through or more control systems. Preferably, each of the reflective mirrors are angled at 45° to direct the incoming light at 90°.

Figure 6:
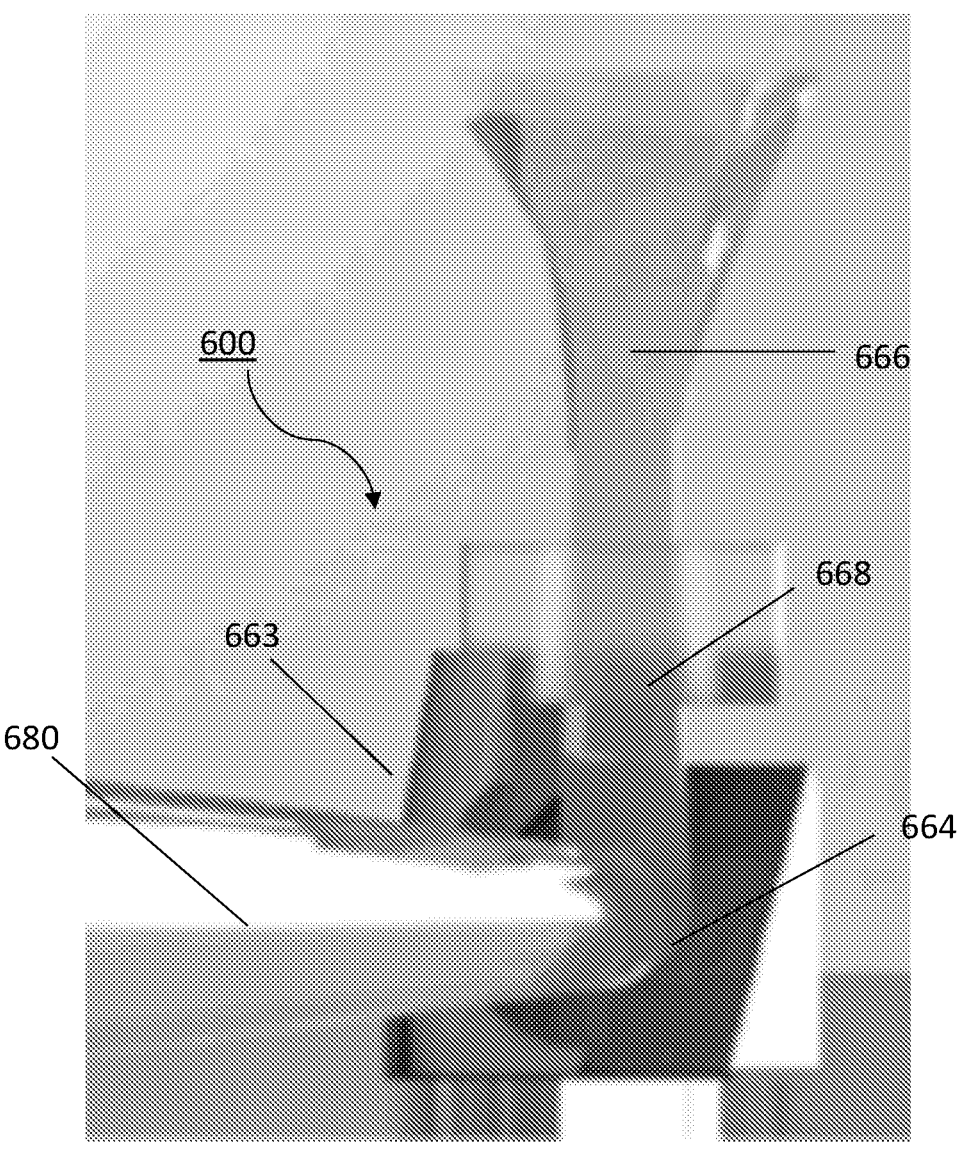
FIG. 6 illustrates a perspective view of an embodiment of a diffuser unit of the invention.

FIG. 6 illustrates one certain embodiment of the invention that may include also a diffuser unit 600 positioned between the first reflective element 664 and the sample. The diffuser unit 600 may include a diffuser element 668 supported by a diffuser support component 663 disposed on or within the objective collar. The diffuser element 668 may be used to create a relatively homogenous illumination profile 666 (e.g., a 'top-hat' profile) of excitation beam 680 that may be determined by the user rather than the traditional Gaussian profile which results in a non-uniform power density across the field of view. Various diffuser elements may be constructed or purchased to provide different illumination profiles. The diffuser 668 may be constructed from a translucent, transparent, or semi-transparent plastic material, such as polymethyl methacrylate (PMMA). The surface of the diffuser 668 may be constructed to have a rough or smooth surface in order to achieve the desired optical property. The diffuser 668 also may be constructed to have a certain shape that will provide a certain illumination profile 666, 766 (e.g. "top-hat" illumination profile).

Figure 7:
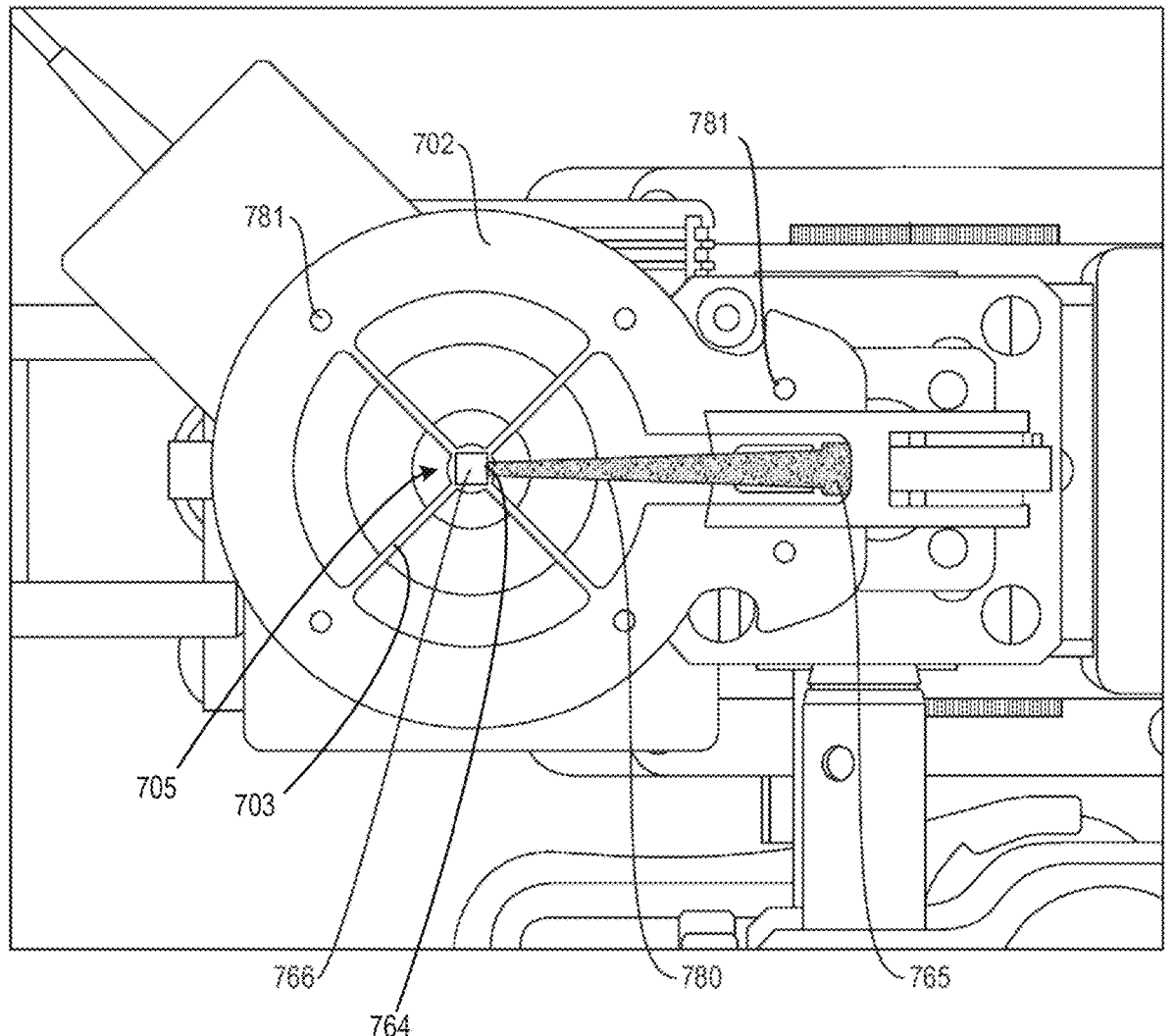
FIG. 7 illustrates a top view of an embodiment of the invention.

FIG. 7 illustrates a top view of one preferred embodiment of the invention showing the excitation light beam 780 being directed by a first reflective element 765 to a second reflective element 764. The second reflect element 764 may then direct the excitation beam upward and parallel to optical axis of the objective directly to the sample, or, first through a diffuser unit 705 positioned above spider element 703—that itself is part of objective collar 702—and onto the sample. Holes 781 may be configured to accept various alignment tools to facilitate alignment or other manipulations of the reflective elements.

Figure 8A:
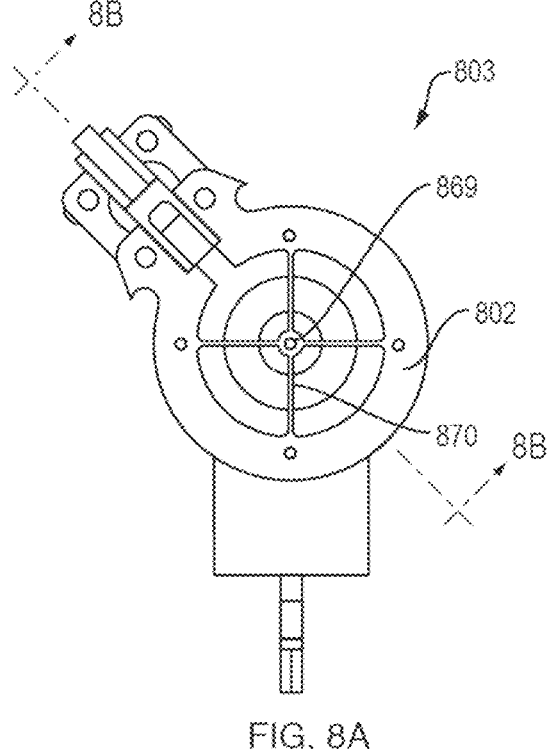
FIG. 8A illustrates a top view of an embodiment of a spider of the invention.
Figure 8B:
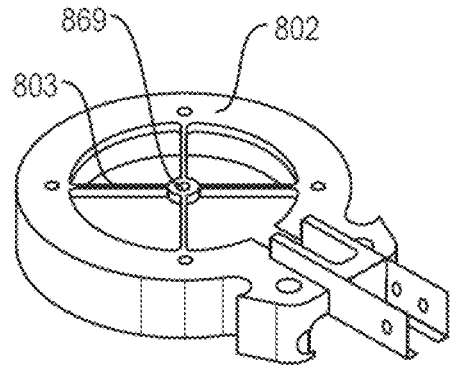
FIG. 8B illustrates a perspective view of the embodiment of FIG. 8A.

FIG. 8A and FIG. 8B illustrate one embodiment of a spider 803 that comprises one or more support structures 870 (arms, spokes, beams, etc.) arranged to extend outward in a plane from a center point 869 to objective collar 802. Typically, the spider 803 supports a secondary mirror positioned on an inner surface of the center point 869. The support structures 870 may act as a central obscuration (blocked area) that causes a reduction of the contrast for low to mid spatial frequencies. The support structures 870 also may cause a faint diffraction pattern that may reduce the quality of the image of the sample. Advantageously, placement of the diffuser unit on the center point 869 of the spider will not lead to further obstruction of the light compared to the placement of the diffuser in another position that interferes with the light path.

After the excitation beam has been directed to the sample, one or more fluorophores in the sample may emit an emission beam that is captured by the objective and directed through the dichroic mirror. The emission light is then captured by one or more imaging capture device coupled to the microscope through the emissions tube 329. Preferably, the image capturing device is a high resolution, color, digital camera operating at a high-resolution and a high data rate. Images captured by the camera are directed via control electronics, such as a camera link card, to one or more control processors. As is well known by those of ordinary skill in the art, a camera link card may interface with digital cameras supporting the particular protocol and physical interface. Other protocols and physical interfaces are also contemplated in the context of the invention, and one particular interface described is not to be taken as limiting in any way.

A control processor, which may be implemented as a small platform computer system, provides the data processing and platform capabilities for hosting an application software program suitable for developing the necessary command and control signals for operating the microscope system. Control processor includes specialized software or circuitry capable of performing image processing functions. For example, control processor may perform image analysis and obtain measurements of contrast, entropy, sharpness, etc. Control processor may also contain specialized software or circuitry capable of manipulating and combining digital images. The control processor may be able to receive and interpret commands issued by a system user on a conventional input device, such as a mouse or a keyboard, and is further able to convert user defined commands into signals appropriate for manipulating the various components of the microscope system.

The control processor is typically coupled to the microscopy system through an interface, such as a serial interface, a Peripheral Component Interconnect (PCI) interface, or anyone of a number of alternative coupling interfaces, which, in turn, defines a system interface to which the various control electronics operating the microscope system are connected.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A microscope system for illuminating a fluorophore comprising:
   an excitation light source;
   a microscope comprising:
      a mirror-based objective supporting an objective collar;
      a tube configured to receive an excitation light beam directed parallel to an optical axis of the mirror-based objective, a first end of the tube connected to a reflective element positioning adapter;
      a first reflective element positioned to reflect the excitation light beam, the first reflective element disposed in the reflective element positioning adapter that is movable in two or more axes, the reflective element positioning adapter connected to the first end of the tube and connected to the objective collar;
      a second reflective element positioned horizontally and in line with the first reflective element and disposed on a center support element, the second reflective element configured to reflect the excitation light beam into a sample to cause fluorescence of the fluorophore in the sample; and a light diffuser unit positioned above the second reflective element and held in position by a light diffuser support component attached to the objective collar, wherein the light diffuser unit is configured to adjust an illumination profile of the excitation light beam to illuminate the fluorophore.

2. The system of claim 1 further comprising a focusing element housing disposed after the first end of the tube to focus the excitation light beam.

3. The system of claim 2, wherein the focusing element housing hosts a lens or mirror.

4. The system of claim 2, wherein the focusing element housing hosts one or more convex or concave lenses.

5. The system of claim 1, wherein the excitation light source is a bulb, LED light, or laser.

6. The system of claim 1 further comprising an image capture device to collect emission light from the sample.

7. The system of claim 6, wherein the image capture device is a CCD camera.

8. The system of claim 1, wherein the light diffuser support component surrounds the second reflective element and contacts with the light diffuser unit and contacts a spider element positioned within the objective collar.

9. The system of claim 1 further comprising an excitation beam positioner element optically connected to the tube, wherein the excitation beam positioner element includes a housing and one or more reflective elements positioned within the housing, the reflective elements configured to direct excitation light from the excitation light source to the tube.

10. The system of claim 1 further comprising an image capture device coupled to the microscope via an emissions tube.

11. The system of claim 1, wherein each of the first reflective element and the second reflective element comprises one of a mirror, lens, or prism, or a combination thereof.

* * * * *